April 18, 1950     L. B. FARRELL     2,504,190
COMBINATION BACK REST AND BED TRAY
Filed Aug. 7, 1948
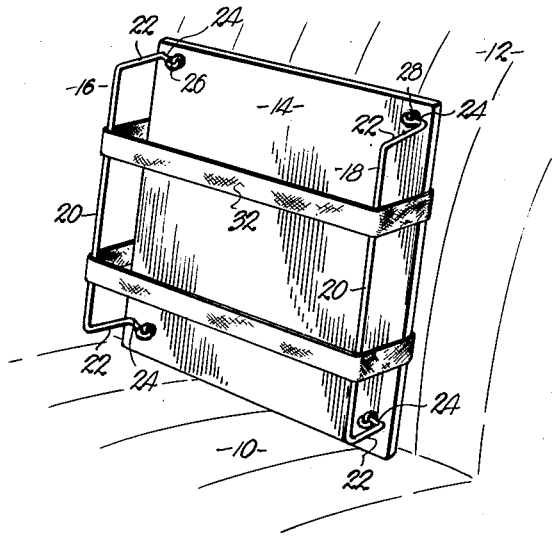
Fig. 1.
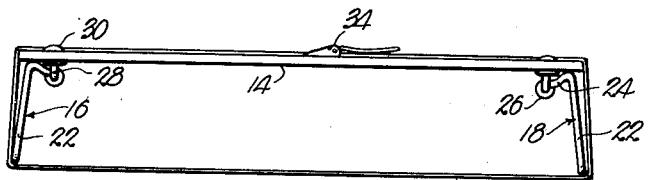
Fig. 2.
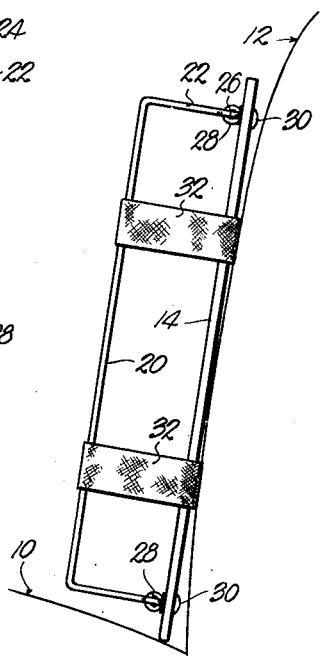
Fig. 4.
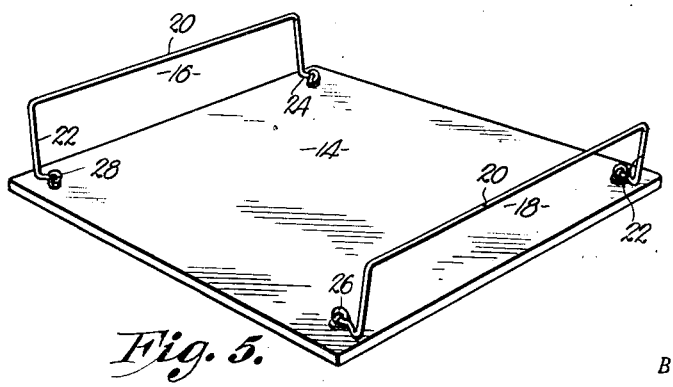
Fig. 3.
Fig. 5.
INVENTOR.
Lura B. Farrell
BY
ATTORNEY.

Patented Apr. 18, 1950

2,504,190

UNITED STATES PATENT OFFICE 2,504,190

COMBINATION BACK REST AND BED TRAY

Lura B. Farrell, Coshocton, Ohio

Application August 7, 1948, Serial No. 43,128

4 Claims. (Cl. 155—182)

This invention relates to a device particularly adapted for use as a back-rest when disposed in supported relationship with a chair, davenport or automobile seat and capable of maintaining the user's back in spaced relationship to the seat itself or to any other relatively solid continuous member to the end that free ventilation is presented to the user.

The most important object of this invention is to provide a back-rest of the above mentioned character that is so formed and constructed as to be readily converted to additional uses, particularly as a carrying tray and also as a bed tray.

Another important object of the present invention is to provide a back-rest of the nature forming the subject matter of my U. S. Letters Patent No. 2,182,253, issued December 5, 1939, entitled Ventilated back rest but embodying certain improvements and advantages over and above the device shown therein and in addition to having the multitude of uses above mentioned, being entirely practical from a standpoint of manufacture, both from the standpoint of expense and ease of handling.

The ventilated back-rest shown and described in the aforesaid patent is capable of carrying forth the primary object thereof of presenting a ventilated back support but the complicated construction thereof renders the same impractical from the standpoint of manufacturing expense and also because of its bulky and cumbersome characteristic which proved to be a tremendous disadvantage when the same was placed in use.

It is one of the most important objects of this invention therefore, to provide a combination back-rest and tray that eliminates all of the undesirable features of the device forming the subject matter of Patent No. 2,182,253 presenting a simple, sturdy, inexpensive and easily manufactured item that is readily convertible to the uses above mentioned and is also light in weight, streamlined because of the elimination of all unnecessary parts, yet capable of carrying out all of the objects of the device heretofore disclosed in my prior patent, together with many other functions.

An important object of this invention is the provision of a combination back-rest and tray having a base formed from any light weight material and preferably of a flat strip of sheet material having extending laterally from one face thereof, a pair of opposed brackets, both of which have pivotal connection with the base and provided with means for limiting the extent of pivotal movement of the brackets in one direction away from each other.

A further object of this invention is the provision of a device of the above mentioned character having flexible bands that entirely circumscribe the base and its brackets in relatively tight stretched relationship thereto, the brackets being provided with integral structure engageable with the proximal face of the base for limiting swinging outward movement of the brackets while maintaining the bands in a taut condition.

Other objects of the present invention include the manner in which the circumscribing bands are formed with means for readily releasing the same to the end that the base and its brackets might be used for either a carrying tray or a bed tray; the way in which the brackets are each provided with legs having lateral extensions serving to limit the outward swinging movement thereof; the manner in which the said extensions are formed and disposed to maintain the brackets in a position where the same diverge as the base is approached; and many additional more minor objects, all of which will be made clear or become apparent as the following specification progresses, reference being had to the accompanying drawing, wherein:

Fig. 1 is a perspective view of a combination back-rest and bed tray made in accordance with my present invention showing the same in operative use as a back-rest.

Fig. 2 is a top plan view thereof.

Fig. 3 is a top plan view of the device shown in Figs. 1 and 2 with the encircling bands or strips entirely removed and illustrating the position of the brackets in the folded condition against one face of the base.

Fig. 4 is a side elevational view of the structure shown in Fig. 1 of the drawing; and Fig. 5 is a perspective view showing the device in an inverted position with the encircling band removed and with the brackets in a condition extended from that of Fig. 3.

Fig. 1 of the drawing shows fragmentarily an automobile seat broadly designated by the numeral 10 together with its accompanying back support 12. It is to be understood of course, that such automobile parts are for illustrative purposes only and that the back-rest about to be described may well be used with any type of chair, davenport or any other upholstered piece of furniture.

A base, broadly designated by the numeral 14, may take any desired configuration but is preferably a flat piece of material having a pair of opposed planar surfaces.

The material from which base 14 is made might well be wood, composition board, light weight metal or other strong and sturdy material as desired.

A pair of brackets 16 and 18 of identical character extend laterally from one face of the base 14, said brackets 16 and 18 being substantially U-shaped having a bight portion 20, a pair of legs 22, an extension 24 integral with each leg 22 respectively and projecting laterally from the free ends of legs 22 and an eye 26 formed in the free end of each extension 24 respectively.

Bight 20 of the brackets 16 and 18 is preferably substantially straight and the legs 22 thereof are disposed at right angles to bight 20 and in parallelism. The length of the bight 20 of brackets 16 and 18 is but slightly less than the height of the base 14 when in the normal upright position shown in Fig. 1 and each of the eyes 26 is coiled about a loop 28 formed on one end of a bolt 30 that passes through the base 14. Accordingly, there are four bolts 30 disposed adjacent the four corners of the polygonal base 14 for accommodating and pivotally mounting the two brackets 16 and 18 by means of the inter-coiled loops 28 and corresponding eyes 26 of bolts 30 and extensions 24 respectively.

A plurality of strips are stretched tightly across the bights 20 of the brackets 16 and 18 and formed by bands 32 that completely encircle the base 14 and brackets 16 and 18. A pair of such bands 32 is shown in Figs. 1, 2 and 4 of the drawing but obviously, any number may be used as desired. The ends of the tape forming bands 32 are interconnected by a suitable adjustable clamp 34, the character whereof forms no part of this invention and, therefore, may be selected from the open market to suit conditions. Bands 32 are formed from any flexible material and the tightness thereof across the bights 20 of brackets 16 and 18 can be varied by manipulation of the clamps 34. Obviously, the distance between the stretch of the bands 32 across brackets 16 and 18 away from the proximal face of base 14 depends upon the length of the legs 22 of brackets 16 and 18. As clearly illustrated in Fig. 2 of the drawing, when the bands 32 are drawn tightly into position, the legs 22 of brackets 16 and 18, diverge as the proximal face of base 14 is approached. The extensions 24 on legs 22 operate to maintain the brackets 16 and 18 in such position since the same project at substantially right angles to the legs 22 and the point of merger between legs 22 and extensions 24 is in direct contacting relationship with the base 14 at a point spaced outwardly from bolts 30.

As is clear, particularly in Figs. 2 and 3, the extensions 24 project at a slight angle outwardly from the base 14 as the eye 26 thereof is approached. In order to maintain the brackets 16 and 18 in the position shown in Figs. 1 and 2 of the drawing and limit the extent of outward swinging movement thereof away from each other, the extensions 24 are slightly curved longitudinally between the eye 26 thereof and the leg 22. With such construction of the brackets 16 and 18 and their component parts, together with the way in which the same are mounted upon the base 14 and the manner in which the bands 32 are maintained in a taut condition by reason of clamps 34, it is apparent that the brackets 16 and 18 will cooperate in maintaining such taut condition of the bands 32 and when the device is placed in use with the user's back resting directly against tapes or bands 32, there will be no collapsing of the brackets 16 and 18. And, while the brackets 16 and 18 may swing slightly toward each other when pressure is brought to bear upon tapes 32, such movement will not be sufficient to cause collapsing of the device but will serve in presenting a yieldable and extremely comfortable rest for the user's back. At no time will the back of the user come into contact with the base 14 and consequently a complete ventilating condition is always present.

In the event that it is desired to place the device in use other than as a back-rest, the bands 32 may be readily slipped from the operative position shown in Figs. 1, 2 and 4, loosening the clamps 34 if necessary, whereupon the appearance thereof is either as shown in Fig. 3 or that of Fig. 5. In Fig. 3, the manner in which the brackets 16 and 18 can be swung inwardly where the bights 20 thereof rest directly upon the proximal face of base 14, is clearly illustrated. Storage space necessary for the device is, therefore, kept at a minimum and by the same token the same might be easily packaged in a relatively small bundle. With the bands 32 so removed from the base 14 and brackets 16 and 18, the assembly is capable of use when in the inverted position shown by Fig. 5 for a serving tray. Articles placed upon that face of base 14 having brackets 16 and 18 thereon, can be easily carried by grasping the bights 20 of brackets 16 and 18. In the event that it is desired to use the same as a bed tray, the structure is used in the position shown in Fig. 3 of the drawing with the exception only that the brackets 16 and 18 are swung downwardly to the position shown in Figs. 1, 2 and 4. When used as a bed tray, that face of the base 14 opposite to brackets 16 and 18 will present a flat surface for receiving various articles and the brackets 16 and 18 will operate as supports in the nature of legs for base 14.

It is apparent from the foregoing that a combination back-rest and tray has been provided that is readily adaptable for many uses and entirely capable of carrying forth all of the objects initially set forth herein. A minimum number of parts have been provided, thereby drastically reducing the cost of manufacture presenting structure that can be made light yet durable, depending upon the materials chosen for its manufacture.

Accordingly, the improvement over my above mentioned patent in many respects becomes apparent and while still further modifications and changes might be made in the structure herein disclosed and described, it is desired to be limited only by the spirit of this invention as defined by the appended claims.

Having thus described my invention, what I claim as new and desire to secure by Letters Patent is:

1. In a device of the character described, a base; a pair of spaced apart brackets pivotally secured to the base for swinging movement to and from a position extending laterally from one side of the base; and at least one lateral extension forming a part of said brackets engageable with the base when the brackets are in said position for limiting the extent of swinging movement of the brackets in one direction.

2. In a device of the character described, a base; a pair of spaced apart brackets pivotally secured to the base for swinging movement to and from a position extending laterally from one side of the base; and means forming a part of said brackets engageable with the base when the brackets are in said position for limiting the extent of swinging movement of the brackets in one direction, said brackets each having at least one leg provided with a lateral extension forming said limiting means and disposed to one side of the pivotal connection between the brackets and the base.

3. In a device of the character described, a base; a pair of spaced apart brackets pivotally secured to the base for swinging movement to and from a position extending laterally from one side of the base; means forming a part of said brackets engageable with the base when the brackets are in said position for limiting the extent of swinging movement of the brackets in one direction; and a plurality of strips circumscribing the base and brackets and disposed to hold said limiting means against the base.

4. In a device of the character described, a base; a pair of spaced-apart brackets extending laterally from one side of said base; a plurality of flexible loops circumscribing the base and the brackets, said brackets converging as said side of the base is approached, said brackets being pivotally secured to the base for swinging movement toward and away from each other and converging as the base is approached; and means forming a part of said brackets for limiting the extent of swinging movement thereof away from each other, said means being held in engagement with the base by the loops.

LURA B. FARRELL.

REFERENCES CITED

The following references are of record in the file of this patent:

UNITED STATES PATENTS

| Number | Name | Date |
|---|---|---|
| 2,182,253 | Farrell | Dec. 5, 1939 |
| 2,277,927 | McGregor | Mar. 31, 1942 |